(12) United States Patent
Zhang et al.

(10) Patent No.: US 9,804,427 B2
(45) Date of Patent: Oct. 31, 2017

(54) FILM-ATTACHING APPARATUS

(71) Applicants:BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yu Zhang, Beijing (CN); Xinqing Zhu, Beijing (CN); Guangyuan Cai, Beijing (CN); Jianlei Yang, Beijing (CN); Yongkang Hou, Beijing (CN); Gang Wang, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 14/861,176

(22) Filed: Sep. 22, 2015

(65) Prior Publication Data

US 2016/0187678 A1    Jun. 30, 2016

(30) Foreign Application Priority Data

Dec. 24, 2014  (CN) .......................... 2014 1 0821121

(51) Int. Cl.
   *G02F 1/13*   (2006.01)
   *B32B 37/00*  (2006.01)
   *B32B 38/18*  (2006.01)

(52) U.S. Cl.
   CPC ........ *G02F 1/1303* (2013.01); *B32B 37/0046* (2013.01); *B32B 38/1841* (2013.01);
   (Continued)

(58) Field of Classification Search
   CPC ......... G02F 1/1303; G02F 1/13; B29C 63/02; B29C 63/024; B65H 39/14;
   (Continued)

(56) References Cited

U.S. PATENT DOCUMENTS 3,803,949 A  *  4/1974  Rokosky ............. B23Q 16/026
                                                       74/815
2003/0172874 A1*  9/2003  Kawaguchi ....... H01L 21/68778
                                                       118/728
(Continued)

FOREIGN PATENT DOCUMENTS

CN     102656508 A     9/2012
CN     103827945 A     5/2014
(Continued)

OTHER PUBLICATIONS

English translation of Abstract of DE 3217424.*
(Continued)

*Primary Examiner* — Philip Tucker
*Assistant Examiner* — Jimmy R Smith, Jr.
(74) *Attorney, Agent, or Firm* — Collard & Roe, P.C.

(57) ABSTRACT

A film-attaching apparatus comprising a base, a substrate bearing member configured to bear a substrate and a film bearing member configured to bear a film; the film bearing member is rotatable between a closed position and an open position; the film bearing member at the closed position has a bearing surface in opposite to that of the substrate bearing member such that a first portion of the film is contacted with a first portion of the substrate; and the substrate bearing member is movable in translational motion along a direction of the bearing surface of the substrate bearing member upon the film bearing member being at the closed position such that the bearing surfaces of the substrate bearing member and of the film bearing member are movable with respect to
(Continued)

each other to attach a second portion of the film onto a second portion of the substrate.

15 Claims, 2 Drawing Sheets

(52) U.S. Cl.
CPC ......... *B32B 37/003* (2013.01); *B32B 38/1858* (2013.01); *B32B 2457/202* (2013.01)

(58) Field of Classification Search
CPC . B32B 37/0046; B32B 37/10; B32B 37/1027; B32B 37/1018; B32B 37/1858; B32B 38/1808; B32B 38/1825; B32B 38/1833; B32B 38/1841; B32B 2041/04; B32B 37/14; B32B 37/144
USPC ........ 156/538, 556, 581, 574, 539, 543, 552
See application file for complete search history.

(56) References Cited

U.S. PATENT DOCUMENTS

2003/0178121 A1    9/2003  Hopkins et al.
2016/0059531 A1 *  3/2016  Zhang ................... B29C 63/02
                                                      156/579

FOREIGN PATENT DOCUMENTS

| CN | 203616289 U | * | 5/2014 | |
| CN | 203705763 U |   | 7/2014 | |
| DE | 3217424 A1 | * | 11/1983 | .............. G01B 3/56 |
| KR | 20110099834 A | * | 9/2011 | |
| KR | 10-1355582 B1 |   | 1/2014 | |
| KR | 101355582 B1 | * | 1/2014 | |
| TW | 457615 B |   | 10/2001 | |
| TW | 201134666 A |   | 10/2011 | |

OTHER PUBLICATIONS

Machine translation of KR20110099834.*
Machine translation of KR101355582.*
Machine translation of description of CN203616289.*
Chinese Office Action in Chinese Application No. 201410821121.2, dated Dec. 1, 2016 with English translation.
Second Chinese Office Action in Chinese Application No. 201410821121.2, dated Jun. 27, 2017 with English translation.

* cited by examiner

FILM-ATTACHING APPARATUS

CROSS REFERENCE TO RELATED APPLICATIONS

This application claims priority under 35 U.S.C. §119 of Chinese Application No. 201410821121.2 filed on Dec. 24, 2014, the disclosure of which is incorporated by reference.

TECHNICAL FILED

Embodiments of the present invention relate to a film-attaching apparatus.

BACKGROUND

In the filed of displaying technology, Liquid Crystal Display (LCD) has been widely applied for its advantageous such as small size, low energy consumption, no radiation and high resolution ratio. The manufacture of LCD comprises a film-attaching process to attach a protection film onto a display panel, which is, currently, well-known to be performed by utilizing an automatic machine or by manual attaching operation.

The film-attaching process by means of an automatic attaching machine usually utilizes an apparatus dedicated to attach a polarizer (POL), which not only involves expensive facility cost but also occupies normal production capacity; while the film-attaching process by manual attaching operation involves expensive labor cost and cannot effectively ensure an operation rate and an attaching accuracy as required.

SUMMARY

At least one embodiment of the present invention provides a film-attaching apparatus configured to attach a film onto a substrate, comprising: a base; a substrate bearing member configured to bear a substrate; and a film bearing member configured to bear a film; wherein, the film bearing member is hinged at the base and is rotatable between a closed position and an open position with respect to the base; upon the film bearing member being at the closed position, a bearing surface of the film bearing member and a bearing surface of the substrate bearing member are in opposite to each other such that a first portion of the film is contacted with a first portion of the substrate; and the substrate bearing member is movably disposed on the base, and is movable in translational motion in a direction of the bearing surface of the substrate bearing member upon the film bearing member being at the closed position, such that the bearing surface of the substrate bearing member and the bearing surface of the film bearing member are movable with respect to each other to attach a second portion of the film onto a second portion of the substrate.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Directing at technical problems that the well-known process of attaching a protection film onto a panel is usually performed by utilizing an automatic machine which occupies normal operation capacity or by manual operation which cannot ensure operation rate and attaching accuracy as required, embodiments of the present invention provide a film-attaching apparatus.

Figure 1:
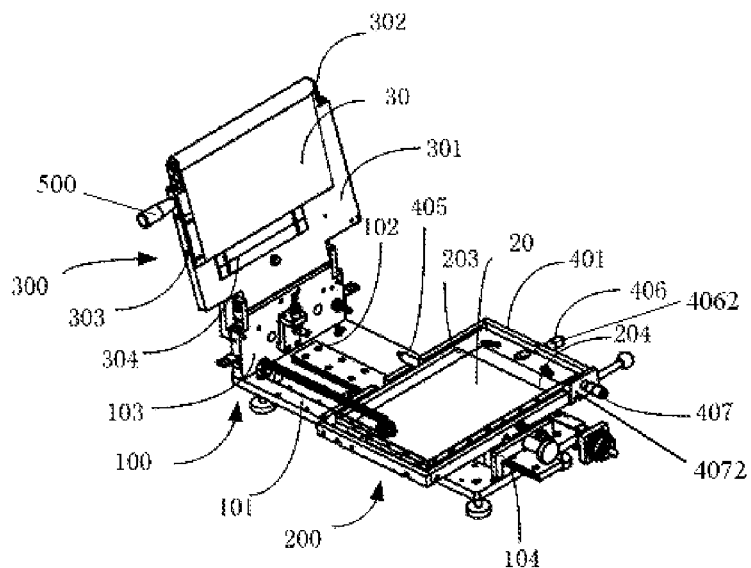
FIG. 1 is a schematically structural view of a film-attaching apparatus as provided by embodiments of the present invention, in which the film bearing member is at the open position.

FIG. 1 is a schematically structural view of a film-attaching apparatus as provided by at least one embodiment of the present invention, which is configured to attach a film onto a substrate. As illustrated in FIG. 1, the film-attaching apparatus comprises a base 100; a substrate bearing member 200 configured to bear a substrate 20; and a film bearing member 300 configured to bear a film 30; wherein the film bearing member 300 is hinged at the base 100 and is rotatable between a closed position and an open position with respective to the base 100; wherein upon the film bearing member 300 being at the closed position, a bearing surface of the film bearing member 300 and a bearing surface of the substrate bearing member 200 are in opposite to each other such that a first portion of the film 30 is in contact with a first portion of the substrate 20; the substrate bearing member 200 is movably disposed on the base 100, and is movable in translational motion along a direction of the bearing surface of the substrate bearing member 200 upon the film bearing member 30 being at the closed position such that the bearing surface of the substrate bearing member 200 and the bearing surface of the film bearing member 300 are movable with relative to each other so as to attach a second portion of the film 30 onto a second portion of the substrate 20.

For a film-attaching process utilizing the film-attaching apparatus as provided by at least one embodiment of the present invention, upon the substrate 20 being placed on the substrate bearing member 200 and the film 30 being placed on the film bearing member 300, the film bearing member 300 is rotated to the closed position; and at this time, a first portion of the film 30 is in contact with a first portion of the substrate 20; then the substrate 20 is moved in translational motion in a direction of the bearing surface of the substrate bearing member 200 such that the bearing surface of the substrate bearing member 200 and the bearing surface of the film bearing member 300 are moving with relative to each other, and a second portion of the film 30 is moving in translational motion along with the substrate 20 so as to be gradually attached onto the substrate 20; upon completing the current film-attaching, the film bearing member 300 is rotated to the open position for the next film-attaching. The above film-attaching apparatus as provided by embodiments of the present invention has a simple structure with convenient operation and causes no air bubble; furthermore, it saves cost and doesn't occupy normal production capacity as compared with well-known film-attaching methods utilizing automatic machine, and improves the operation rate and the attaching accuracy as compared with well-known film-attaching methods by manual operation.

As illustrated in FIG. 1, in an embodiment of the present invention, the film bearing member 300 comprises: a film absorption plane 301 configured to absorb a first portion of the film 30, the film absorption plane 301 is provided with a plurality of first vacuum holes 3010 which are uniformly distributed and are connected to an vacuum apparatus (not illustrated); and a film feeder 302 configured to receive a second portion of the film 30 and gradually release the second portion of the film 30 during the translational motion of the substrate bearing member 200 along the base 100 upon the first portion of the film 30 being in contact with the first portion of the substrate 20; wherein the film feeder 302 is disposed at one side of the film absorption plane 301.

According to the above-mentioned solution, the film absorption plane 301 allows the first portion of the film 30 to be unfolded smoothly, and the second portion of the film 30 extending beyond the film absorption plane 301 is received within the film feeder 302; upon the film bearing member 300 being rotated to the closed position, the first portion of the film 30 absorbed by the film absorption plane 301, at a planar state thereof, is attached onto the first portion of the substrate 20 by means of surface contact with the first portion of the substrate 20 on the substrate bearing member 200; further, the second portion of the film 30 is gradually released by the film feeder 302 along with the translational motion of the substrate bearing member 200, and the first portion of the film 30 that has been attached onto the substrate 20 is also released by the film absorption plane 301; at this time, as a result of the first portion of the film 30 being attached onto the substrate 20, the second portion of the film 30 being released by the film feeder 302 is pressed against the substrate 20, which is moving in translational motion, by the film absorption plane 301, so as to be attached onto the substrate 20 along with the translational motion of the substrate 20; thereby completing the film-attaching process. During such film-attaching process, the film 30 is gradually attached onto the substrate 20 under an extrusion of the film absorption plane 301, which will not bring about any air bubble and hence ensures the film-attaching quality.

Moreover, in the above-mentioned solution, the film 30 is fixed by way of vacuum absorption in that, at the beginning of the film-attaching process, the vacuum is switched on to absorb the film 30 onto the film absorption plane 301, and upon the first portion of the film 30 being in contact with the substrate 20, the vacuum is switched off to release the first portion of the film 30 from the film absorption plane 301, which is simple in operation. Of course, it should be understood that in practical implementation the film 30 can be placed onto the film bearing member 300 by other means.

In an embodiment as provided by the present invention, as illustrated in FIG. 1, the film feeder 302 comprises: a reel 302 configured to receive and release the film 30. The reel 302 can be used as the film feeder 302 described in the above-mentioned solution to achieve a simple structure, and can also serve to maintain a planar state of the film 30. It should be understood that, in practical implementation, other structures can also be used as the film feed 302, and will not be described in details herein.

Additionally, in an embodiment as provided by the present invention, the above-mentioned film bearing member 300 further comprises a first positioning module which is disposed on the film absorption plane 301 and configured to position the film 30. Positioning the film 30 by means of the first positioning module ensures the film-attaching accuracy.

In an example, as illustrated in FIG. 1, the first positioning module comprises: a first limiting rod 303 configured to limit a displacement of a first edge of the first portion of the film 30; and a second limiting rod 304 configured to limit a second edge of the first portion of the film 30, wherein the second edge is abutting the first edge. In the above-mentioned solution, a displacement of two adjacent edges of the film 30 can be limited by means of the first limiting rod 303 and the second limiting rod 304. It should be understood that, in practical implementation, other structures can also be used as the first positioning module and will not be described in details herein.

Figure 3:
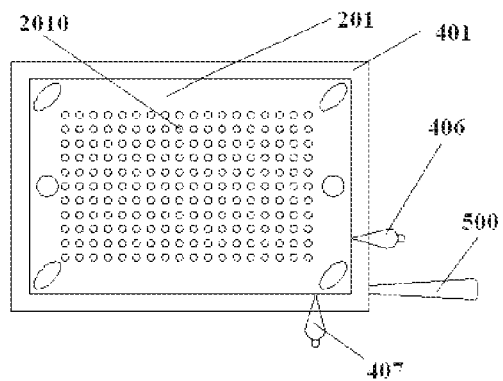
FIG. 3 is a top view of the substrate bearing member of the film-attaching apparatus as provided by embodiments of the present invention.

As illustrated in FIG. 1 and FIG. 3, in an embodiment as provided by the present invention the substrate bearing member 200 comprises a substrate absorption plane 201 configured to absorb the substrate 20. The substrate absorption plane 201 is uniformly distributed with a plurality of vacuum holes 2010 connected to a vacuum apparatus (not illustrated).

In the above-mentioned solution, the substrate 20 is fixed by way of vacuum absorption in that, at the beginning of the film-attaching process, the vacuum is switched on to absorb the substrate 20 onto the substrate absorption plane 201, and upon the completion of the film-attaching process, the vacuum is switched off and the substrate 20 can be removed from the substrate absorption plane 201; which is simple and convenient in operation. Of course, it should be understood that in practical implementation the substrate 20 can be placed onto the substrate bearing member 200 by other means.

In an embodiment as provided by embodiments of the present invention, the substrate bearing member 200 further comprises a second positioning module which is disposed on the substrate absorption plane 201 and configured to position the substrate 20. Positioning the substrate 20 by means of the second positioning module ensures the film-attaching accuracy.

In an example, as illustrate in FIG. 1, the second positioning module comprises: a third limiting rod 203 configured to limit a first edge of the substrate 20; and a fourth limiting rod 204 configured to limit a second edge of the substrate 20, wherein the second edge of the substrate 20 is abutting the first edge of the substrate 20. In the above-mentioned solution, a displacement of two adjacent edges of the substrate 20 can be limited by means of the third limiting rod 203 and the fourth limiting rod 204. It should be understood that, in practical implementation, other structures can also be used as the second positioning module and will not be described in details herein.

In an embodiment as provided by the present invention, as illustrate in FIG. 1, the base 100 comprises: a base plate 101 configured to be in parallel with the bearing surface 201 of the substrate bearing member 200, the base plate 101 is provided with a rail 102 extending along a first direction parallel with the bearing surface 201 of the substrate bearing member 200, and the substrate bearing member 200 is disposed on the rail 102 and movable along the rail 102; and a side plate 103 disposed vertically on the base plate 101, at an end of the rail 102, wherein the film bearing member 300 is hinged at the side plate 103.

In the above-mentioned solution, the substrate bearing member 200 is movably disposed on the base 100 through the rail 102; upon the film bearing member 300 being at the closed position, a translational motion of the substrate bearing member 200 along the direction of the bearing surface of the substrate bearing member 200 is achieved. It should be explained that no limitation is given to the structure of the rail herein.

In an example, as illustrate in FIG. 1, a limiting module 104 can be positioned at the other end of the rail 102 opposite to the end provided with the side plate 103, and the limiting module 104 is configured to prevent the substrate bearing member 200 from separating from the rail 102.

Moreover, in embodiments as provided by the present invention, for example, the film-attaching apparatus further comprises an alignment mechanism configured to align the substrate 20 on the substrate bearing member 200 with the film 30 on the film bearing member 300, in order to further ensure the film-attaching accuracy.

Hereafter an assembling process of the alignment mechanism of the film-attaching apparatus in an embodiment of the present invention will be described in details.

In an embodiment of the present invention, the alignment mechanism comprises: a first adjustment assembly configured to adjust a location of the substrate bearing member 200 in a first direction which is parallel with the bearing surface 201 of the substrate bearing member 200; a second adjustment assembly configured to adjust a location of the substrate bearing member 200 in a second direction which is parallel with the bearing surface 201 of the substrate bearing member 200 and is perpendicular to the first direction; and a third adjustment assembly configured to adjust a location of the substrate bearing member 200 in a third direction which is perpendicular to the bearing surface 201 of the substrate bearing member 200.

The locations of the substrate 20 in the first direction, the second direction and the third direction are adjustable by means of the above-mentioned first adjustment assembly, second adjustment assembly and third adjustment assembly, respectively, so as to accurately align the substrate 20 with the film 30.

Figure 5:
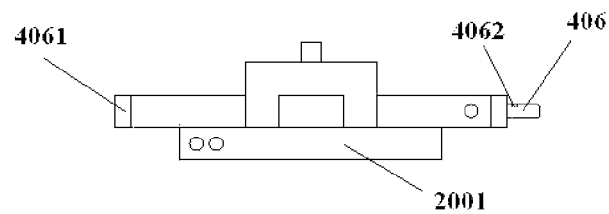
FIG. 5 is a front view of the substrate bearing member of the film-attaching apparatus as provided by embodiments of the present invention.

As illustrate in FIG. 1 and FIG. 5, in an embodiment of the present invention, the alignment mechanism comprises: a bearing base 2001 on which the substrate bearing member 200 is movably disposed; a receiving frame 401 which is disposed on the bearing base 2001 to enclose an external circumference of the substrate bearing member 200 and has a predetermined space from the substrate absorption plane 201 of the substrate bearing member 200, wherein the receiving frame 401 comprises a first edge and a second edge which are disposed along the first direction, as well as a third edge and a fourth edge which are disposed along the second direction, wherein the third edge and/or the fourth edge are/is provided with a first through hole 4050.

Figure 4:
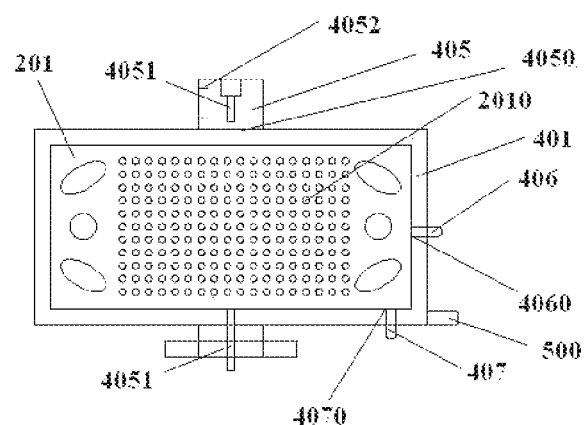
FIG. 4 is another top view illustrating more details of the substrate bearing member of the film-attaching apparatus as provided by embodiments of the present invention.

In an example, as illustrated in FIG. 1, FIG. 4 and FIG. 5, the first adjustment assembly comprises: a first pushing rod 405 disposed along the first direction, having a first end fixed at the substrate absorption plane 201 and the other end penetrating through the first through hole 4050, wherein the first pushing rod 405 is movable along the first direction through the first through hole 4050 so as to push the substrate absorption plane 201 moving along the first direction; and a first limiting member 4051 configured to limit a displacement of the first pushing rod 405.

With the above-mentioned solution, upon aligning the substrate 20 with the film 30 in the first direction, the first pushing rod 405 is pushed in the first direction and then drives the substrate absorption plane 201 connected thereto moving in the first direction, so as to complete the alignment of the substrate 20 in the first direction; upon completing the alignment of the substrate 20, a displacement of the first pushing rod 405 is limited by means of the first limiting member 4051 so that the substrate 20 will not deviate from a desired position. Precisely adjusting the location of the substrate 20 by means of a structure of a pushing rod allows convenient operation and high accuracy.

In an example, a body the first pushing rod 405 is provided with a scale 4052 configured to precisely measure an amount of displacement of the first pushing rod 405 so as to precisely adjust the location of the substrate bearing member 200 in the first direction.

It should be explained that, in practical implementation, the first adjustment assembly is not limited to the structure described herein. For example, it can be a hydraulically retractable rod which is retractable along the first direction, with no details thereof described herein.

Moreover, in an embodiment of the present invention, as illustrate in FIG. 1, FIG. 4 and FIG. 5, the first edge and/or second edge of the receiving frame 401 are/is further provided with a second through hole 4060.

The second adjustment assembly comprises a second pushing rod 406 disposed along the second direction, having one end fixed at the substrate bearing member 200 and the other end penetrating through the second through hole 4060, wherein the second pushing rod 406 is movable along the second direction through the second through hole 4060 so as to push the substrate absorption plane 201 moving along the second direction; and a second limiting member configured to limit a displacement of the second pushing rod 406.

With the above-mentioned solution, upon aligning the substrate 20 with the film 30 in the second direction, the second pushing rod 406 is pushed in the second direction and then drives the substrate absorption plane 201 connected thereto moving in the second direction, so as to complete the alignment of the substrate 20 in the second direction; upon completing the alignment of the substrate 20, a displacement of the second pushing rod 406 is limited by means of the second limiting member 4061 so that the substrate 20 will not deviate from the desired position. Precisely adjusting the location of the substrate 20 by means of a structure of a pushing rod allows convenient operation and high accuracy.

In an example, a body the second pushing rod 406 is provided with a scale 4062 configured to measure an amount of displacement of the second pushing rod 406 so as to precisely adjust a location of the substrate bearing member 200 in the second direction.

It should be explained that, in practical implementation, the second adjustment assembly is not limited to the structure described herein. For example, it can be a hydraulically retractable rod which is retractable along the first direction, with no details thereof described herein.

Figure 6:
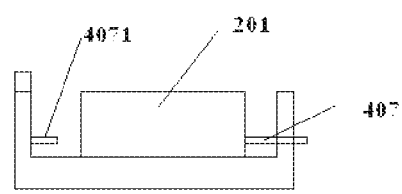
FIG. 6 is a side view of the substrate bearing member of the film-attaching apparatus as provided by embodiments of the present invention.

Moreover, in an embodiment of the present invention, as illustrate in FIG. 1, FIG. 4 and FIG. 6, the third adjustment assembly comprises: a rotation axis 407 in a direction identical with a direction of the translational motion of the substrate bearing member 200, wherein the rotation axis 407 is connected to the substrate bearing member 200, and is rotatable about an axle center thereof to drive the substrate bearing member 200 rotating in a plane perpendicular to the bearing surface 201 of the substrate bearing member 200, so as to adjust a location of the substrate bearing member 200 in the third direction; and a third limiting member 4071 configured to limit a rotation angle of the rotation axis 407.

In an example, the rotation axis 407 is connected to the bearing base 2001 and hence is connected to the substrate bearing member 200.

In the above-mentioned solution, for example, a levelness of a surface of the substrate 20 is adjustable by means of the third adjustment assembly, in order to ensure that the substrate 20 is always parallel with the film 30. During adjusting the levelness of the surface of the substrate 20, the rotation axis 407 is rotated to drive the substrate bearing member 200 connected thereto rotating in a plane of the second direction and the third direction, so as to adjust the levelness of the surface of the substrate 20; upon completing the adjustment of the levelness, a rotation of the rotation axis 407 is limited by means of the third limiting member 4071 so that the substrate 20 will not deviate from the desired position.

In an example, the third adjustment assembly further comprises: an angle measuring instrument 4072 configured to measure a rotation angle of the rotation axis 407. By arranging the angle measuring instrument 4072, it can precisely measure the rotation angle of the rotation axis 407 and hence precisely adjust the rotation angle of the substrate 20, so as to ensure the film-attaching accuracy. For example, the angle measuring instrument 4072 can be an angulometer 4072 fixed at the bearing base 2001, wherein the rotation axis 407 is disposed at a center of the angulometer 4072, and a pointer can be disposed on the rotation axis 407 to determine the rotation angle of the rotation axis 407. Of course, the angle measuring instrument 4072 is not limited to the structure described herein but can be implemented with others.

Figure 2:
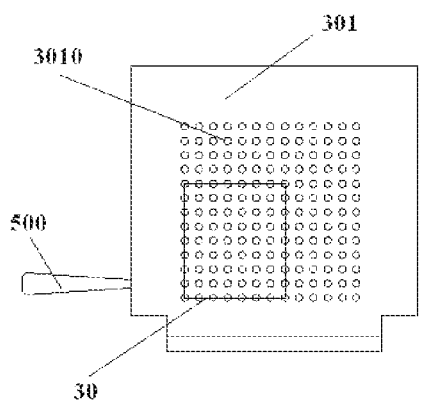
FIG. 2 is a top view of the film bearing member of the film-attaching apparatus as provided by embodiments of the present invention.

Moreover, as illustrate in FIG. 1, FIG. 2 and FIG. 3, in an embodiment of the present invention, an operation handle 500 is disposed on both of the film absorption plane 301 and the substrate absorption plane 201 of the film-attaching apparatus, for convenience of operation.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

The present application claims the priority of China patent application No. 201410821121.2 titled "apparatus of aligning and assembling" filed on Dec. 24, 2014, which is incorporated herein by reference in its entirely.

What is claimed is:

1. A film-attaching apparatus configured to attach a film onto a substrate, comprising:
   a base;
   a substrate bearing member configured to bear a substrate; and
   a film bearing member configured to bear a film; wherein,
   the base comprises: a base plate disposed in parallel with a bearing surface of the substrate bearing member, the base plate is provided with a rail extending along a first direction parallel with the bearing surface of the substrate bearing member; and a side plate vertically disposed on the base plate, at an end of the rail,
   the film bearing member is hinged at the side plate of the base and is rotatable between a closed position and an open position with respect to the base, wherein upon the film bearing member being at the closed position, the bearing surface of the film bearing member and the bearing surface of the substrate bearing member are opposite to each other such that a first portion of the film is contacted with a first portion of the substrate; and
   the substrate bearing member is disposed on the rail of the base and movable via translational motion along the rail a upon the film bearing member being at the closed position, such that the bearing surface of the substrate bearing member and the bearing surface of the film bearing member are movable with respect to each other to attach a second portion of the film onto a second portion of the substrate.

2. The film-attaching apparatus of claim 1, wherein, the film bearing member comprises:
   a film absorption plane configured to absorb the first portion of the film, wherein the film absorption plane is provided with a plurality of first vacuum holes which are uniformly distributed; and
   a film feeder disposed at one side of the film absorption plane and configured to receive the second portion of the film and gradually release the second portion of the film during the translational motion of the substrate bearing member along the base upon the first portion of the film being contacted with the first portion of the substrate.

3. The film-attaching apparatus of claim 2, wherein, the film feeder comprises a reel configured to receive and release the film.

4. The film-attaching apparatus of claim 2, wherein, the film bearing member further comprises a first positioning module which is disposed on the film absorption plane and configured to position the film.

5. The film-attaching apparatus of claim 4, wherein, the first positioning module comprises:
   a first limiting rod configured to limit a displacement of a first edge of the first portion of the film; and
   a second limiting rod configured to limit a displacement of a second edge abutting the first edge of the first portion of the film.

6. The film-attaching apparatus of claim 1, wherein,
the substrate bearing member comprises a substrate absorption plane configured to absorb the substrate, wherein the substrate absorption plane is provided with a plurality of second vacuum holes which are uniformly distributed.

7. The film-attaching apparatus of claim 6, wherein,
the substrate bearing member further comprises a second positioning module which is disposed on the film absorption plane and configured to position the film.

8. The film-attaching apparatus of claim 7, wherein,
the second positioning module comprises:
a third limiting rod configured to limit a displacement of a first edge of the substrate; and
a fourth limiting rod configured to limit a displacement of a second edge abutting the first edge of the substrate.

9. The film-attaching apparatus of claim 1, further comprising an alignment mechanism configured to align the substrate on the substrate bearing member with the film on the film bearing member.

10. The film-attaching apparatus of claim 9, wherein,
the alignment mechanism comprises:
a bearing base on which the substrate bearing member is movably disposed;
a receiving frame disposed on the bearing base to surround an external circumference of the substrate bearing member, with a predetermined space from the substrate bearing member, wherein the receiving frame has a first edge and a second edge both disposed in a first direction parallel with the bearing surface of the substrate bearing member, and a third edge and a fourth edge both disposed in a second direction which is parallel with the bearing surface of the substrate bearing member and is perpendicular to the first direction, wherein at least one of the third edge and the fourth edge is provided with a first through hole; and
a first adjustment assembly configured to adjust a location of the substrate bearing member in the first direction, wherein the first adjustment assembly comprises:
a first pushing rod disposed in the first direction, having one end fixed at the substrate bearing member and the other end configured to be penetrating through the first through hole, wherein the first pushing rod is movable along the first direction through the first through hole to push the substrate bearing member moving in the first direction; and
a first limiting member configured to limit a displacement of the first pushing rod.

11. The film-attaching apparatus of claim 10, wherein,
a body of the first pushing rod is provided with a scale.

12. The film-attaching apparatus of claim 10, wherein,
at least one of the first edge and the second edge of the receiving frame is provided with a second through hole; and
the alignment mechanism further comprises a second adjustment assembly configured to adjust a location of the substrate bearing member in the second direction, wherein the second adjustment assembly comprises:
a second pushing rod disposed along the second direction, having one end fixed at the substrate bearing member and the other end configured to be penetrating through the second through hole, wherein the second pushing rod is movable along the second direction through the second through hole to push the substrate bearing member moving in the second direction; and
a second limiting member configured to limit a displacement of the second pushing rod.

13. The film-attaching apparatus of claim 12, wherein,
a body of the second pushing rod is provided with a scale.

14. The film-attaching apparatus of claim 9, wherein,
the alignment mechanism comprises a third adjustment assembly configured to adjust a location of the substrate bearing member in a third direction which is perpendicular to the bearing surface of the substrate bearing member, wherein the third adjustment assembly comprises:
a rotation axis of which an axial center has a direction identical with a direction of the translational motion of the substrate bearing member, wherein the rotation axis is connected to the substrate bearing member, and is rotatable about the axial center to drive the substrate bearing member rotating in a plane perpendicular to the bearing surface of the substrate bearing member to adjust a location of the substrate bearing member in the third direction; and
a third limiting member configured to limit a rotation angle of the rotation axis.

15. The film-attaching apparatus of claim 14, wherein,
the third adjustment assembly further comprises an angle measuring instrument configured to measure a rotation angle of the rotation axis.

* * * * *